March 22, 1960
A. BACIGALUPO
2,929,356
METHOD FOR DISPENSING SLURRIED ANIMAL FEED
Filed July 1, 1957
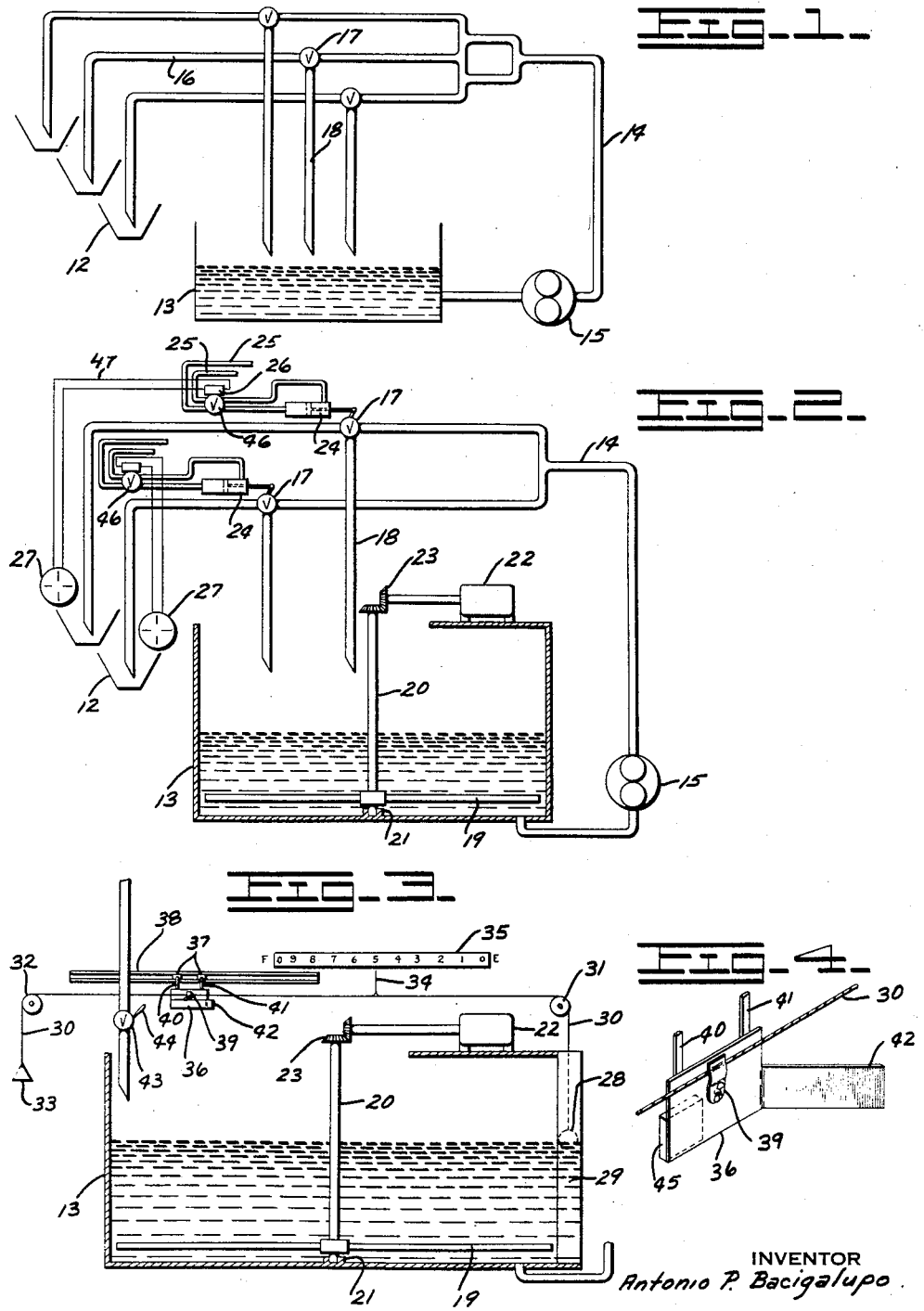
INVENTOR
Antonio P. Bacigalupo
BY
Winston E. Miller
ATTORNEY

United States Patent Office 2,929,356
Patented Mar. 22, 1960

2,929,356
METHOD FOR DISPENSING SLURRIED ANIMAL FEED

Antonio Bacigalupo, Isidro, Lima, Peru

Application July 1, 1957, Serial No. 669,106

6 Claims. (Cl. 119—51)

This invention relates to an automatic feeding apparatus for animals and more particularly to an automatic feeding apparatus whereby slurried feed is simultaneously distributed to a group of animals, with each animal of the group receiving a controlled, pre-selected amount of feed according to its needs.

The art of dairy farming has in recent years become highly specialized and requires modern and efficient management and operation. Not only must a high standard of efficiency in operation be observed, but the present day health and sanitation codes preclude slipshod handling operations with respect to feed, animals, and product intended for public consumption.

Rising costs have necessitated the use of standardized, mechanized, time-saving, feeding and milking procedures. The development of automatic milking machines has led to the "milking parlor" innovation. A "milking parlor" is a room where dairy cows are milked and fed and usually contains a desired number of stalls, usually between 6 and 12 depending on the size of the farm. This "milking parlor" room makes it possible to maintain healthful and sanitary conditions during the critical milking and feeding operation so that the exigencies of health and sanitation codes are met and satisfied.

A milking man who is in charge of the "milking parlor" has many duties to perform, one of the most important of which is the measuring of the amount of feed to be given to each cow on an individual basis. A younger cow has to be fed more than an older one; cows that produce more milk have to be fed more; a cow that weighs more needs more food; and cows that produce more fat in their milk have to eat more. Thus, when the cows enter the "milking parlor" and are locked into the empty stalls, the milking man has to go to each individual trough, measure the required amount of dry feed for each cow and mix it with water. Then he must hurry to clean the udders, adjust the milking machines to the cows, shut them off as the milking of each cow is completed, release the milked and fed cows, and guide other cows to enter the stalls.

The milking man is hard pressed to handle all these operations of a "milking parlor" and still cautiously measure the feed for each cow. From an economic viewpoint it is extremely important that he do so as the cost of feeding comprises about 50 percent of the total expenses involved in dairy farming. If more feed than is necessary is given to each cow, the farmer can lose a great deal of money. If not enough feed is given, the cows will not produce at their peak efficiency.

The cows must be fed as they are being milked. It has been found that feeding stimulates the milk let-down and keeps the cow quiet for the milking procedure.

The milking man cannot economize on his time by giving the cows dry feed instead of liquid because it has been found that less time is consumed if the cows drink their feed instead of eating it. Research conducted at Michigan State University has shown that on the average it takes seven minutes to milk a cow, and it takes fourteen minutes for the cow to eat its dry feed. There is a great saving in time if a slurried feed method is used so that the feeding time equals the milking time. Also, the use of dry feed concentrate in the "milking parlor" has created a problem as it is dusty and easily contaminates the milk intended for human consumption.

It is therefore an object of this invention to provide an automatic feeding apparatus capable of distributing selected amounts of slurried feed simultaneously to a plurality of cows on an individual basis.

An object of this invention is to provide automatic slurry feeding apparatus capable of simultaneously feeding a group of animals, while pre-determining and controlling the amount of feed delivered to each animal.

Another object of this invention is to provide an automatic feeding apparatus capable of being pre-set to deliver the desired amount of feed to be subsequently delivered to individual stalls.

A further object of this invention is to provide an automatic feeding apparatus for pre-mixing dry-feed concentrate and water for subsequent delivery to the individual stalls of a "milking parlor."

A still further object of this invention is to provide an automatic feeding apparatus for re-cycling unused feed mix to a mixing and storage tank.

Still another object of the present invention is to provide a device operating from a tank which selectively delivers desired amounts of slurried feed to any one or a plurality of units and circulates unused slurry to the tank for redistribution as required, and the delivered feed differing in selective amounts in each unit.

Another object is to provide an automatic feeding apparatus capable of feeding a large number of cows with a minimum of effort, supervision and expenditure.

Still another object is to provide an automatic feeding apparatus capable of feeding a large number of cows under sanitary conditions as required by health and sanitation codes.

Other objects and advantages found in the construction of my invention will be apparent from a consideration of the following specification in connection with the appended claims and the accompanying drawings.

In the drawings:

Figure 1 is a flow diagram of the path followed by the slurried feed illustrating the valves which are actuated to deliver pre-selected amounts of slurried feed through individual outlets.

Figure 2 is a schematic view of an installation illustrating the use of an electric timing clock to actuate air-piston driven valves for delivery of slurried feed as desired and further showing the agitator and pump installation.

Figure 3 is a schematic view of the mixing chamber illustrating the use of the automatic slurried feed level control.

Figure 4 is an enlarged perspective view of the slider mechanism which is a part of the slurry level control system and automatically shuts off the water supply when the mixing tank has been filled to the desired level.

General description

In general, an automatic slurry feeding apparatus is provided for installation in a typical "milking parlor" or barn. Individual feeding troughs 12 are provided at each stall for receiving the necessary and correct amount of feed to be consumed by the cow occupying the stall. While the cow is being milked, the food, in the form of slurried feed, is available for consumption. A tank 13 is provided for continuously mixing dry feed concentrate and water and storing the resultant slurry mixture between feedings. For sanitary reasons the tank is preferably located in another room or outside of the "milking parlor."

A main distributing pipe or conduit 14 is connected to the mixing tank 13 and leads into the "milking parlor." A pump 15 delivers slurried feed from the tank 13 to the main distributing pipe 14. Trough delivery pipes or outlets 16 lead from the main delivery pipe 14 to each individual trough 12 in each stall. Metering devices, such as electric clocks, operating time delay valves, etc. at each stall can be pre-set to deliver feed for a certain desired length of time. The selected setting of the metering devices actuates valves 17 that divert slurried feed from the main distributing pipe to the trough delivery pipes. Recycling conduits 18 connected to the main distributing pipe or conduit 14 return unused feed to the mixing tank 13 where it is stored until the next feeding period or circulated for use as required. A mixer or agitator element 19 is provided in the mixing tank 13 so as to continuously agitate the liquid feed, thus maintaining an homogeneous mixture at all times. This agitation is assisted by the circulation to and from the tank 13.

The advantages of this invention are many. This type of automatic feeding apparatus allows controlled feeding for each individual cow. Studies have shown that cows consume feed in a liquid or slurried state more quickly than feed in dry bulk form. Inasmuch as time spent milking is less than time spent for feeding, overall time per cow spent in the "milking parlor" can be materially reduced by decreasing the time necessary for feeding. This is particularly true in the present invention because each cow is milked and fed simultaneously.

The major advantage in this invention is that the "milking parlor" operator can pre-set a metering device for each stall to deliver any desired amount of feed and the metering device terminates delivery when the desired amount of feed has been delivered without any supervision by the operator. The amount of feed necessary for each cow is determined by the weight of the cow, the age of the cow, the rate of milk production of the cow, and the butter fat content in the milk of the cow. The availability of this type of selective and individual feed control insures proper feeding of cows and eliminates expensive over-feeding. It is within the scope of the invention to remotely control the timing means and thus remotely control the amount of feed delivered to each individual animal as it is being fed.

A level indicating system, shown in Figure 3, is provided on the mixing tank 13 which at all times shows the level of slurried material in the tank. In addition, a slider attachment is incorporated into the level indicating system which automatically shuts off the water input to the tank when the selected level has been attained.

*Specific description*

In the preferred embodiment, a mixing and storage tank 13 for slurried liquid mash is provided proximate to a "milking parlor." This tank 13 is preferably located outside of the actual milking and feeding area in an adjoining room or outside of the "milking parlor" building. This is desirable for sanitary reasons because of the dust created while mixing dry feed and liquid in the tank. The tank 13 can be a permanent installation constructed from concrete or may be constructed from any suitable metal and be more of a portable nature. The size of the tank can be varied to meet the requirements of each specific installation. An agitator 19 is provided in the tank 13 for mixing and stirring the liquid mash. The agitator 19 is preferably constructed of steel and is located near the bottom of the mixing tank 13. It is mounted on a vertical shaft 20 which is pivoted on a brass support 21 in the bottom of the tank 13. The blades of the agitator 19 direct the slurried feed upwardly, thus creating constant circulation of the mass. In the preferred embodiment, the agitator 19 is driven by a one H.P. motor 22 acting through gears 23. A pump 15 is provided proximate to the tank 13 and is utilized for pumping the liquid mash through a system of main distributing pipes 14. The pump 15 is of the centrifugal, open blade type. It has been found that in a three-stall set-up, a 1″ pump is satisfactory. Under these conditions, the pump is powered by a 1½ H.P., tri-phasic, 110 volt electric motor. Naturally, an increase in the number of stalls will call for different size pumps and motors. The distributing pipes 14 are constructed from galvanized iron and are 1″ in diameter. However, it is within the scope of this invention to utilize piping constructed from other metals or to utilize flexible piping of plastic, rubber, or synthetic materials which may be found to be satisfactory.

Diversion valves 17 are provided on the distributing pipe system 14 in order to divert liquid feed to individual feed troughs 12 as desired. The valves 17 are standard brass two-way valves, however, other types of valves could be utilized to perform the same function and these are included within the scope of this invention. Air pistons 24 are provided to actuate the diversion valves 17 as desired. The air pistons 24 are of a 4″ diameter. It is within the scope of this invention to vary the size of the pistons or to employ other means of actuating the diversion valves 17. The air pistons 24 are powered by vacuum lines 25. It is contemplated that the vacuum and pressure lines employed by milking machines could also be utilized to power the air pistons 24, however, an independent source of power could be provided. Solenoids 26 are utilized to actuate air diversion valves 46 that in turn control the air pistons 24. The solenoids 26 are actuated by electric timers 27 that are positioned at each individual feed trough 12. The timers 27 are connected to the solenoids 26 by wires 47. It is within the scope of this invention that a single movable timer could service several individual feeding troughs. The exact position of the timer 27 devices can be varied to suit the needs of a particular milking parlor lay-out.

The level indicating system, as shown in Figure 3, gives a constant indication of the level of the slurried material in the mixing tank 13. A float 28 moves in a vertical channel 29 provided in the mixing tank 13. A line 30 is connected to the top of the float 28 and mounted around pulleys 31 and 32. A counter-weight 33 is connected to the line 30 at the end opposite the floater. An indicator 34 is affixed to the line and a scale 35 is positioned proximate to the indicator 34 so as to cooperate with it to indicate the exact level of the slurried material.

A slider member 36 is also mounted on the line 30, as shown in detail in Figure 4. The slider supports 37 ride in a track 38 parallel to the line 30. The slider member 36 is mounted on the line 30 by use of a bracket 39. Arms 40 and 41 connect the slider member 36 to the slider supports 37. A bar extension 42 extends outwardly from the slider member 36 and trips a water shut-off valve 43 by engaging the lever 44 when the mixing tank has filled to the desired level. A counter-weight 45 is mounted on the slider member 36 to counter-balance the bar extension 42. The use of other types of level indicating means may be utilized and use of such with means to automatically control the water supply to the mixing tank is considered within the scope of this invention.

*Operation*

This method for slurry dispensing includes the continuous mixing of dry feed concentrate and liquid so as to form a pumpable slurried material. The slurried material is then conducted to a central area. Pre-selected amounts of slurried material are then tapped off as desired. Slurried material which is not tapped off is returned to the mixing point for re-cycling as desired.

In operation, the dry feed, liquid, and any other ingredients are poured into the mixing and storage tank 13 in any desired amount and proportion. Due to the fact that the tank 13 is located away from the milking parlor, actual mixing is accomplished without incurring sanitary problems created due to dust that is raised during the mixing operation. Furthermore, a supply of slurried feed can thus be provided that is sufficient for several feedings. Time-consuming measuring and mixing on an individual stall basis is thus avoided.

During the milking period, each cow to be milked is placed in an individual stall or at least before an individual feed trough 12. The milking machine is then attached to the cow and the milking is begun. The "milking parlor" operator then sets the electric timer 27 for any desired time interval. This will cause slurried feed to be delivered to the individual trough 12 during this time interval and automatically shutting off delivery when the time has elapsed. The time interval and hence, the setting on the electric timer 27 can be varied according to the amount of feed required by each individual cow according to its weight, age, amount of milk production, and the butter-fat content of the milk produced. In this manner, positive control of feed utilized is achieved without time-consuming monitoring. When the milking operation is completed, the cow is led from the stall and another cow is brought in and the cycle begun again. It is thus seen that during milking a "milking parlor" operator does not need to devote time to feeding of the cows, other than setting the timer 27 at each stall. In operation, the pump 15 constantly maintains a circulation of liquid mash through distributing pipes 14 that extend through the "milking parlor." The "milking parlor" operator thus sets an electric timer 27 and causes liquid feed to be diverted to an individual trough 12 for any length of time.

Although the piping system shown in Figures 1 and 2 is the preferred embodiment of the operation, it is within the scope of the invention that various systems of piping can be utilized as long as the basic concept of automatic selective controlled delivery of liquid mash to individual feeding troughs from a central mixing and storage tank is not deviated from.

Various modifications of the invention may be made without departing from the principle thereof. Each of these modifications is to be considered as included in the hereinafter appended claims unless these claims by their language expressly provide otherwise.

Having thus set forth the nature of my invention, I claim the following:

I claim:
1. In a method for the simultaneous slurried feeding of animals, the steps which include: combining food ingredients to form a slurry; cycling said slurry; selectively diverting a pre-selected measured portion of said cycling slurry sufficient to meet the individual requirements of an animal being fed; and delivering said measured portion to said animal.

2. In the method of claim 1, the step of: selectively diverting said pre-selected measured portion of said cycling slurry for a definite period of time.

3. In the method of claim 1, the step of: selectively diverting all of said cycling slurry for a definte period of time.

4. In the method of claim 1, the step of: selectively diverting a plurality of pre-selected measured portions of said cycling slurry sufficient to meet the individual requirements of animals being fed.

5. In the method of claim 1, the step of: selectively diverting a plurality of pre-selected measured portions of said cycling slurry, wherein each of said portions are diverted for a definite period of time in accordance with the individual requirement of each animal being fed.

6. In a method for the simultaneous slurried feeding of animals, the steps which include: combining food ingredients to form a slurry; cycling said slurry; selectively diverting a plurality of pre-selected measured portions of said cycling slurry, each of said measured portions being diverted for a definite period of time in accordance with the individual requirement of the animals being fed; and delivering each of said measured portions to each of said animals individually.

References Cited in the file of this patent

UNITED STATES PATENTS

| | | |
|---|---|---|
| 2,081,947 | McCornack | June 1, 1937 |
| 2,189,213 | MacConell | Feb. 6, 1940 |
| 2,555,437 | Edwards | June 5, 1951 |
| 2,578,863 | Trelease | Dec. 18, 1951 |
| 2,642,837 | Schroeder | June 23, 1953 |
| 2,738,765 | Hart | Mar. 20, 1956 |
| 2,782,760 | Wolff | Feb. 26, 1957 |